Patented Sept. 16, 1930

1,775,870

UNITED STATES PATENT OFFICE

ERNST G. SANDMEIER, OF LOCARNO, SWITZERLAND, ASSIGNOR TO SWISS JEWEL CO. S. A., OF LOCARNO, SWITZERLAND

SYNTHETIC SPINEL GEM RESEMBLING BLUE ZIRCON

No Drawing. Application filed May 3, 1928. Serial No. 274,974.

The present invention relates to synthetic gems coloured like natural blue zircons and having the chemical composition and the physical properties of spinels.

In my prior application No. 257,797, filed Feb. 28, 1928, I have explained the manner of producing synthetic green spinels, but the production of synthetic precious stones having the bright blue colour of the natural blue zircon, turning into green in artificial light and belonging mineralogically to the species of spinels, has not been known heretofore. The manufacture of such stones is substantially like the well known Verneuil process for producing sapphires, described in Patent No. 988,230, granted March 28, 1911 to A. V. L. Verneuil, according to which the constituent materials are mixed in a powdered state and are fed through an oxy-hydrogen flame onto a fire clay column or support where they are fused together and form an artificial stone built up of successive layers of a curved shape.

The proportions of the constituent ingredients are 86% alumina, 10% magnesia, 3% oxide of manganese and traces of the oxides of cobalt and titanium.

Owing to the fact that the flame, during the formation of the stone from the powder is kept at a very high temperature, say 1900° C., so that any other compounds of said metallic elements other than the oxides are reduced to the state of oxides during their passage through said flame, all such compounds, or even the pure powdered metals, can also be used as constituents. But then their proportions have to be chosen according to their relative chemical values in order to maintain the true proportions in the final product.

The stone produced in the mentioned way has the same hardness of 7 to 8, in the Mohs' scale, diamond being 10, as the natural spinel, but may be distinguished from it by the following characteristics: Cracks or scratches are often seen in the natural stones under a high-power microscope but they seem to be on the surface and resemble the parallel scratches made by a file on the edge of a glass plate. They are probably due to the cutting operation. In the synthetic stone, on the other hand, the cracks, when they occur, appear as genuine rifts beneath the surface, and are generally curved, due probably to the curved layers of which the stone is formed. The layers comprising the natural stone are flat and parallel while those of the synthetic stones are curved, as above stated. The specks or cavity-like spots appearing in the natural stone are bounded by angular or crystal shaped walls, while those occurring in the synthetic stone have curved or bubble-like walls. The above characteristics in nearly all cases must be looked for with a high-power microscope. When cut, however, the transparency and other optical properties of the natural and synthetic stones may be considered identical.

What I claim as new is:

1. A synthetic spinel having a bright blue colour closely resembling that of the natural zircon, containing 86% alumina, 10% magnesia, 3% manganese oxid, and traces of the oxids of cobalt and titanium.

2. A composition of matter adapted to produce synthetic spinels having a bright blue colour closely resembling that of the natural zircons, containing aluminium, magnesium, manganese, cobalt and titanium in such proportions that when heated to a suitable temperature, there will be produced a mass containing 86% alumina, 10% magnesia, 3% manganese oxid, and traces of the oxides of cobalt and titanium.

In testimony whereof I affix my signature.

ERNST G. SANDMEIER.